(12) United States Patent
Freese et al.

(10) Patent No.: US 8,027,855 B2
(45) Date of Patent: Sep. 27, 2011

(54) METHODS OF ASSESSING AND DESIGNING AN APPLICATION SPECIFIC MEASUREMENT SYSTEM

(75) Inventors: Robert P. Freese, Pittsboro, NC (US); John C. Blackburn, Charleston, SC (US); Ryan J. Priore, Columbia, SC (US); David L. Perkins, Irmo, SC (US)

(73) Assignee: Halliburton Energy Services Inc., Houston, TX (US)

( * ) Notice: Subject to any disclaimer, the term of this patent is extended or adjusted under 35 U.S.C. 154(b) by 1431 days.

(21) Appl. No.: 11/442,915

(22) Filed: May 30, 2006

(65) Prior Publication Data
US 2007/0282647 A1    Dec. 6, 2007

(51) Int. Cl.
*G06Q 10/00* (2006.01)
(52) U.S. Cl. .......................... 705/7; 705/7.11; 705/7.37
(58) Field of Classification Search ............... 705/7.11, 705/7.37
See application file for complete search history.

(56) References Cited

U.S. PATENT DOCUMENTS

| | | | |
|---|---|---|---|
| 4,607,914 A * | 8/1986 | Fienup ............................. | 359/19 |
| 5,090,807 A | 2/1992 | Tai | |
| 5,737,076 A | 4/1998 | Glaus et al. | |
| 5,905,571 A * | 5/1999 | Butler et al. .................. | 356/328 |
| 5,945,676 A | 8/1999 | Khalil et al. | |
| 6,430,513 B1 | 8/2002 | Wang et al. | |
| 6,529,276 B1 * | 3/2003 | Myrick ......................... | 356/419 |
| 6,600,560 B2 | 7/2003 | Mikkelson et al. | |
| 6,707,043 B2 * | 3/2004 | Coates et al. ............ | 250/339.09 |
| 6,870,629 B1 | 3/2005 | Vogel et al. | |
| 7,123,844 B2 | 10/2006 | Myrick | |
| 7,138,156 B1 * | 11/2006 | Myrick et al. ................. | 427/10 |
| 7,245,374 B2 | 7/2007 | Hendriks | |
| 7,834,999 B2 * | 11/2010 | Myrick et al. ............... | 356/303 |
| 7,911,605 B2 * | 3/2011 | Myrick et al. ............... | 356/303 |
| 2006/0142955 A1 * | 6/2006 | Jones et al. .................... | 702/32 |
| 2006/0158734 A1 | 7/2006 | Schuurmans et al. | |
| 2007/0166245 A1 * | 7/2007 | Mackles et al. ................ | 424/49 |
| 2007/0201136 A1 * | 8/2007 | Myrick ......................... | 359/578 |
| 2007/0294094 A1 | 12/2007 | Alessandrini et al. | |

FOREIGN PATENT DOCUMENTS

| | | |
|---|---|---|
| WO | 2004057284 A1 | 7/2004 |
| WO | 2007061435 A1 | 5/2007 |
| WO | 2007061436 A1 | 5/2007 |
| WO | 2007061437 A1 | 5/2007 |
| WO | 2007062202 A1 | 5/2007 |
| WO | 2007062224 A1 | 5/2007 |
| WO | 2007064578 A2 | 6/2007 |

(Continued)

OTHER PUBLICATIONS

Myrick, M.L., Soyemi, O.O., Haibach, F.G., Zhang, L., Greet, H, Li, Priore, R.J., Schiza, M.V., Farr, J.R. "Application of Multivariate Optical Computing to Near-Infrared Imaging." Vibration Spectroscopy-based Sensor System, Proceedings of SPIE vol. 4577, 2002.*

(Continued)

*Primary Examiner* — R. David Rines
*Assistant Examiner* — Renae Feacher

(57) ABSTRACT

Methods of assessing feasibility of a project include receiving a datum from a customer; designing an application specific system based on the datum; analyzing the datum; evaluating a set of input parameters to determine an applicability of the application specific system to a customer process; and providing feedback for the customer process with the application specific system.

32 Claims, 6 Drawing Sheets

FOREIGN PATENT DOCUMENTS

| WO | 2008002903 A2 | 1/2008 |
|---|---|---|
| WO | PCT/US2008/058382 | 3/2008 |
| WO | 2008057912 A2 | 5/2008 |
| WO | 2008057913 A2 | 5/2008 |

OTHER PUBLICATIONS

Martin, E.B., Morris, A.J., Zhang, J. "Process Performance Monitoring Using Multivariate Statistical Process Control." IEE Proc.-Control Theory Appl., vol. 143, No. 2, Mar. 1996.*

"Information Technology; Ometric's SpectrInline Processware demonstrates instantaneous monitoring of pharmaceutical blending." (Apr. 2006). Pharma Business Week,195. Retrieved May 4, 2011, from ProQuest Health and Medical Complete.*

C. Grant Jackson. (Apr. 21). The State, Columbia, S.C., C. Grant Jackson column: Ometric seals key deal. Knight Ridder Tribune Business News,1. Retrieved May 4, 2011, from Business Dateline.*

Soyemi, Olusola O., Zhang, Lixia, Eastwood, DeLyle, Li, Hong, Gemperline, Paul J. and Myrick, Michael L. "A Simple Optical Computing Device for Chemical Analysis." Functional Integration of Opto-Electro-Mechanical Devices and Systems, Michael R. Descour and J.T. Rantala, editors, Proceedings of SPIE vol. 4284, 2001.*

"Ometric Tackles Challenging Problem for conventional Spectroscpy: Real-time, In-line Compliance Testing of Powders." PR Newswire. New York, Mar. 9, 2006, p. 1.*

Soyemi, O., Eastwood, D., Zhang, L., Li, H. Karunamuni, J., Gemperline, Paul J., Synowicki, R.A. and Myrick, Michael L. "Design and Testing of a Multivariate Optical Element:The First Demonstration of Multivariate Optical Computing for Predictive Spectroscopy." American Chemical Society, Feb. 2010, pp. 1069-1079.*

Martin, E.B., Morris, A.J. and Zhang, J."Process Performance Monitoring Using Multivariate Statistical Process Control." IEE Proc.-Control Theory Appl., vol. 143, No. 2, Mar. 1996.*

Haibach, Frederick G. and Myrick, Michael."Precision in Multivariate Optical Computing." Applied Optics, vol. 43, No. 10, Apr. 2004.*

Soyemi, Olusola O., Haibach, Frederick G., Gemperline, Paul J. and Myrick, Micheael L."Nonlinear Optimization Algorithm for Multivariate Optical Element Design." Applied Spectroscopy, vol. 56, No. 4, 2002.*

Myrick, M.L., Soyemi, O., Schiza, M.V., Farr, J.R., Haibach, F.G., Greer, A.E., Li, H. and Priore, R.J."Application of Multivariate Optical Computing to Simple Near-Infrared Point Measurements." Instrumentation for Air Pollution and global Atmoshperic Monitoring, Proceedings of SPIE vol. 4574, 2002.*

Priore, Ryan J."The Design, Fabrication and Implementation of Point Detection and Chemical Inmaging Sensors Utilizing Optical and Digital Regression Techniques." Ph.D. dissertation, University of South Carolina, US, 2005.*

Dialog Search May 4, 2011.*

Proquest Search May 4, 2011.*

* cited by examiner

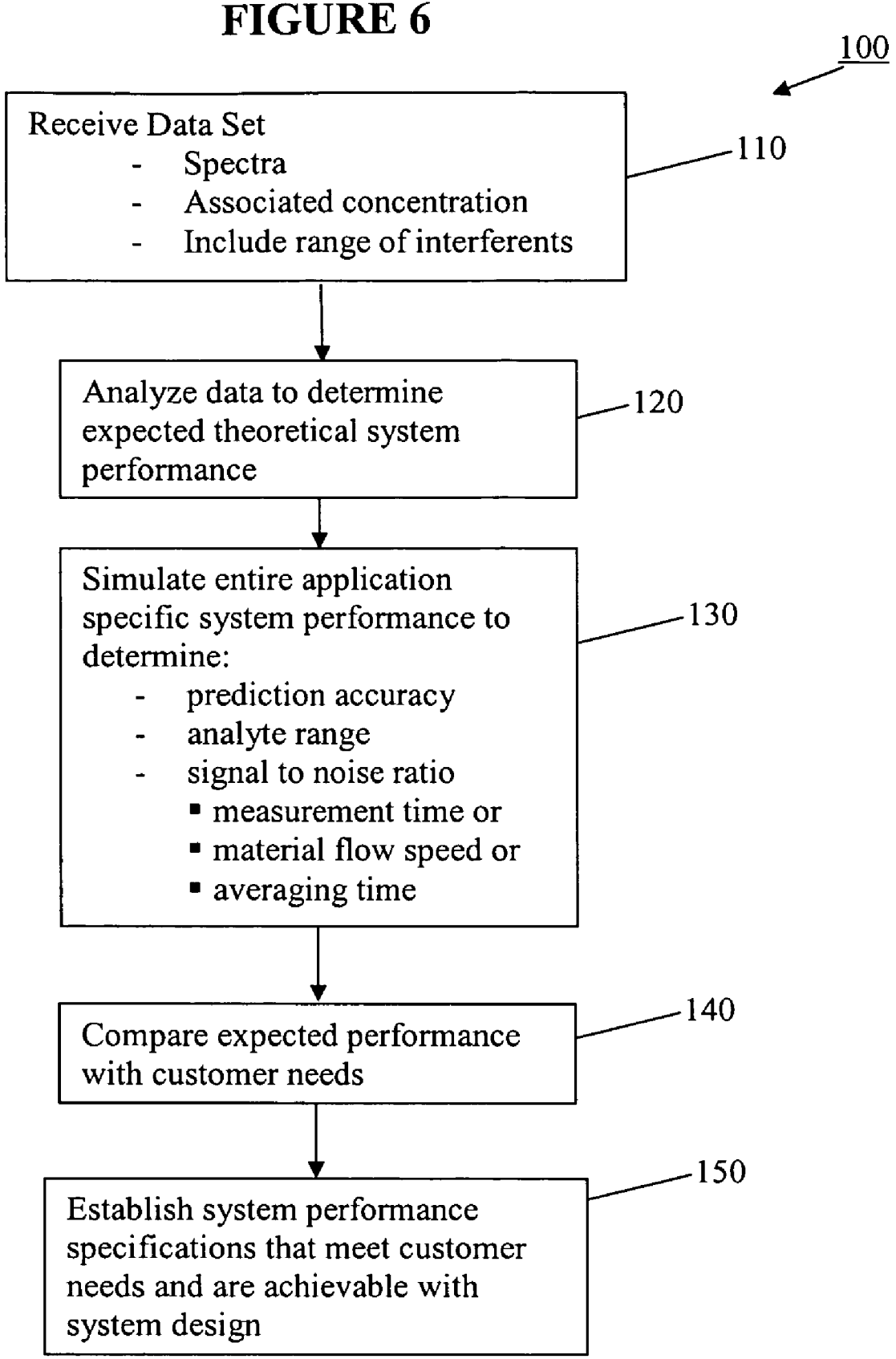

METHODS OF ASSESSING AND DESIGNING AN APPLICATION SPECIFIC MEASUREMENT SYSTEM

BACKGROUND OF THE INVENTION

In an era of rapid technology innovation and higher cost of money, investments in capital equipment are less attractive. Continuous product advances accelerate obsolescence of purchased equipment. Resources are wasted in installation and training as new equipment and products replace obsolete equipment, and cash outlays become more frequent to stay on top of the technology curve. Over time, cost of immobilized capital and service contract expenses can result in multifold increases of the original price paid for capital equipment. Moreover, there is substantial risk that once capital is committed to purchase new equipment, the purchased equipment may not meet expectations.

Optical spectroscopy, for instance, relies on relatively sophisticated equipment for measuring chemicals in many applications. Specifically, due to its relatively non-invasive, non-destructive qualities, optical spectroscopy is employed by a variety of industries such as pharmaceutical, chemical, oil & gas, and food & beverage industries. Modern production controls in these industries require real-time measurement of compound concentrations throughout manufacturing processes to ensure final product quality. However, conventional optical spectrometers can be inherently slow and require significant computer support and costly chemometric resources to provide reliable, actionable results. In many cases, complicated sampling of production material is necessary to perform lab analysis. The overall measurement process is time consuming and resource intensive.

Some industries have attempted to move optical spectroscopy out of the laboratory and to their production lines. However, the challenges of applying laboratory grade instruments to an industrial processing line are not trivial. In many cases, spectrometers are bulky and delicate, and designed for lab environments, not for production floors. Moreover, a conventional spectrometer can be difficult to couple directly to the industrial process line.

Due to the drawbacks of the conventional spectrometer and related equipment, material sampling is a technique of choice in many industries. In the conventional material sampling technique shown in FIG. 1, gases or liquids of interest are conveyed through elaborate sampling techniques and devices to the spectrometer, which typically is housed in a separate, protected area. As shown, optical probes and fiber optic bundles are used in some instances to convey light from a process line to the spectroscopic instruments. However, an inability to directly couple the spectrometer to the process lines affects precise and timely process control and increases equipment cost. Sampling further limits process control and product assurance, and increases equipment and maintenance costs. Additionally, the use of probes affects measurement in spectral areas where optical fiber transmission is limited.

Even in industries in which the foregoing, cumbersome procedure can be employed with a modicum of success, technological advances eventually render presently employed spectrometers and related equipment obsolete, and cash outlays inevitably are required to update the technology.

Moreover, today's industrial processes are highly tailored to specific needs of each company that develops those processes. Therefore, cookie-cutter production equipment cannot meet the highly differentiated challenges each company faces in its manufacturing processes. Additionally, for companies which internally develop the application of optical spectroscopy to their production process control, such projects can become major challenges thereby tying up highly qualified resources. Also, for companies that rely on third-party vendors, there is a major risk of loss of proprietary information, formulation and materials when shared with outside parties.

An urgent need exists for a method of tailoring a process control system to meet specific needs in industry process lines, which will also avoid unnecessary capital equipment expenditures and related equipment obsolescence and depreciation.

BRIEF SUMMARY OF THE DISCLOSURE

In general, the present invention is directed to methods of analyses to predict performance of a comprehensive application specific process control system relative to an industrial process line and to design the application specific process control system based on the predicted performance. It will be appreciated from studying the present disclosure and practicing the disclosed methods that the invention is not limited to determining the performance of only a single element or component of the system, and in fact, avoids this constraint. According to the present invention, all elements of the complete system are designed and modeled. Broadly, this includes not only an application specific optical element, described in detail herein, but also all light sources, detectors, optics (optical train) and the like. This complete analysis enables system performance to be ascertained with a greater confidence than by using simple chemometric or single component analysis alone. As will be further appreciated from the following detailed description, the invention and related component parts are reliable and economical to develop and employ.

By way of example, the industrial process line can include a need to sample production material in real-time, such as in pharmaceutical, environmental, chemical, petroleum (e.g., oil & gas), agriculture, plastics, government (e.g., Homeland Security), and food & beverage process lines. Exemplary methods according to the invention account for on-going product improvements and enhancements in order for a customer to avoid obsolescence and depreciation of capital equipment. The invention also minimizes risks that capital equipment will fail to meet customer expectations. Moreover, a customer can avoid having to research, purchase and install updated capital equipment components and can avoid related implementation of subsequent training of customer personnel. Additionally, the customer can avoid tying up highly qualified resources and risking loss of proprietary information, formulation and materials by needing to share it with outside parties.

By way of further example, the application specific system can be an optical system for multivariate optical computing in real-time in the industry process line. Multivariate optical computing (MOC) is generally described in U.S. Pat. No. 6,198,531 B1 to Myrick et al. and in U.S. Pat. No. 6,529,276 B1 to Myrick as a predictive spectroscopy technique that incorporates a multi-wavelength spectral weighting directly into analytical instrumentation. Both of these patents are incorporated herein for all purposes by reference thereto. The skilled artisan will appreciate that multivariate optical computing is simply provided as one example of the application specific system. Other aspects of the invention include but are not limited to interferometers, spectroscopic instruments, spectroscopic analysis software and the like.

The exemplary optical system technology can be applied to real-time measurements of solids, liquids, gases and their combinations across a range of industrial applications. As briefly introduced, operations with solids include, but are not limited to, monitoring blending of pharmaceutical powders, including excipients, additives, and active pharmaceutical materials; blending of other powders, including food and chemicals; monitoring and analyzing foods, including pet foods, and detecting hazardous bacteria or mold spores and the like on the food; and measuring moving powders, tablets or other compressed solids. Operations with liquids include, but are not limited to, monitoring dispersions and bi-phasic mixtures (such as emulsions); and petroleum (e.g., oil and gas) applications, including analyzing water content in oil, or oil content in water. Operations with gases include, but are not limited to, environmental applications such as stack gas analysis, including measurement of NOx, SOx, CO, CO2, or other gases in a gas stream.

Other environmental applications involving solids, liquids, gases and their combinations include, but are not limited to, wastewater analysis and treatment monitoring; hazardous substance monitoring applications such as mercury vapor detection; detecting a biohazard or chemical agent such as a poison gas or a suspended solid (e.g., anthrax). In a particular aspect of the invention, inclusion of a transmissive window provides physical separation between the measuring device and the process or material being tested. Therefore, this window allows for in-line measurement and/or non-invasive measurement of parameters such as chemical functionality, including alcohol content of petroleum fractions or tackifier resins. The skilled artisan will appreciate that multivariate optical computing is simply provided as one example of the technology option. Other options include but are not limited to interferometers, spectroscopic instruments, spectroscopic analysis software and the like.

More specifically, in one embodiment of the invention, a method of assessing feasibility of a project includes receiving a datum from a customer; designing an application specific multivariate optical computing system based on the datum; analyzing the datum; and evaluating a set of input parameters to determine an applicability of the application specific multivariate optical computing system to a customer process.

According to this method of the invention, the customer is one of a pharmaceutical customer, a fuel customer, a hazardous substance customer, a law enforcement customer, a government customer, a chemical customer, a food customer, and a beverage customer.

Also according to this method, the datum is data selected from the group consisting of a compound of interest, a representative spectrum of the compound of interest, a representative spectra of a mixture, a concentration of interest, an analyte of interest, an expected concentration across a range of expected interferents and combinations thereof. The spectrum is in spectral regions of interest selected from the group consisting of ultraviolet, visible, near infrared, mid infrared, infrared and combinations thereof. The expected interferents include pressure, temperature, humidity, vibration, process component variability and combinations thereof.

Further, the method according to this aspect of the invention can include providing at least one of a concentration range, an accuracy, a speed of measurement, and a system configuration for the analyte of interest to the customer. The method can also include determining performance of the system for the datum, providing feedback to the customer process and/or analyzing the datum remote from a facility of the customer.

According to another aspect of the invention, a method of assessing feasibility of a project includes receiving a datum from a customer; designing an application specific system based on the datum; analyzing the datum; evaluating a set of input parameters to determine an applicability of the application specific system to a customer process; and providing feedback for the customer process with the application specific system.

According to this method of the invention, the customer is one of a pharmaceutical customer, a fuel customer, a hazardous substance customer, a law enforcement customer, a government customer, a chemical customer, a food customer, and a beverage customer.

Also according to this method, the datum is data selected from the group consisting of a compound of interest, a representative spectrum of the compound of interest, a representative spectra of a mixture, a concentration of interest, an analyte of interest, an expected concentration across a range of expected interferents and combinations thereof. The spectrum or spectra is in spectral regions of interest selected from the group consisting of ultraviolet, visible, near infrared, mid infrared, infrared and combinations thereof. The expected interferents include pressure, temperature, humidity, vibration, process component variability and combinations thereof.

Further, the method according to this aspect of the invention can include providing at least one of a concentration range, an accuracy, a speed of measurement, and a system configuration for the analyte of interest to the customer; determining performance of the system for the datum; and/or analyzing the datum remote from a facility of the customer.

According to yet another aspect of the invention, a method of assessing feasibility of a project includes receiving a datum from a consumable products customer; designing an application specific multivariate optical computing system based on the datum; analyzing the datum; and evaluating a set of input parameters to determine an applicability of the application specific multivariate optical computing system to a consumable products customer process.

According to this method of the invention, the consumable products customer is one of a pharmaceutical customer, a fuel customer, a hazardous substance customer, a law enforcement customer, a government customer, a chemical customer, a food customer, and a beverage customer.

Also according to this method, the datum is data selected from the group consisting of a compound of interest, a representative spectrum of the compound of interest, a representative spectra of a mixture, a concentration of interest, an analyte of interest, an expected concentration across a range of expected interferents and combinations thereof. The spectrum is in spectral regions of interest selected from the group consisting of ultraviolet, visible, near infrared, mid infrared, infrared and combinations thereof. The expected interferents include pressure, temperature, humidity, vibration, process component variability and combinations thereof.

Further, the method according to this aspect of the invention providing at least one of a concentration range, an accuracy, a speed of measurement, and a system configuration for the analyte of interest to the consumable products customer. The method can also include determining performance of the system for the datum, providing feedback for the consumable products customer process, and/or analyzing the datum remote from a facility of the consumable products customer.

Other features, aspects and advantages of the invention will be apparent from the following description and the attached drawings, or can be learned through practice of the invention.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 6 is a flow chart of a method according to another aspect of the present invention.

Figure 1:
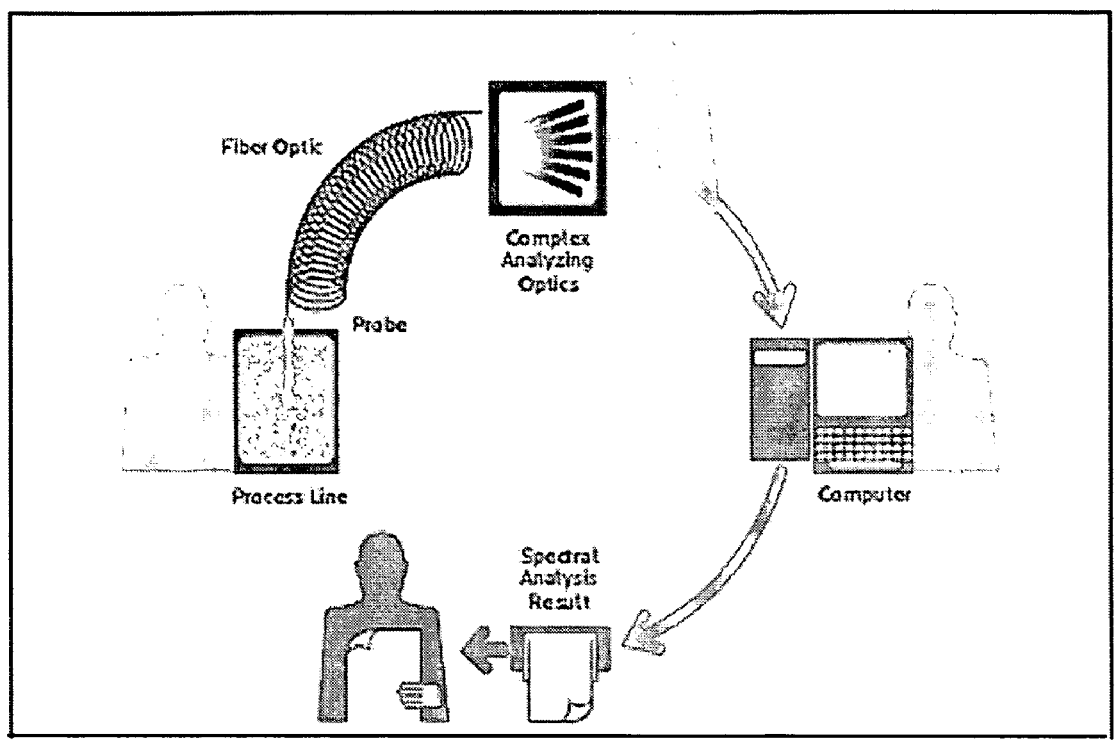
FIG. 1 is a schematic view of a conventional spectroscopic instrument application.
Figure 2:
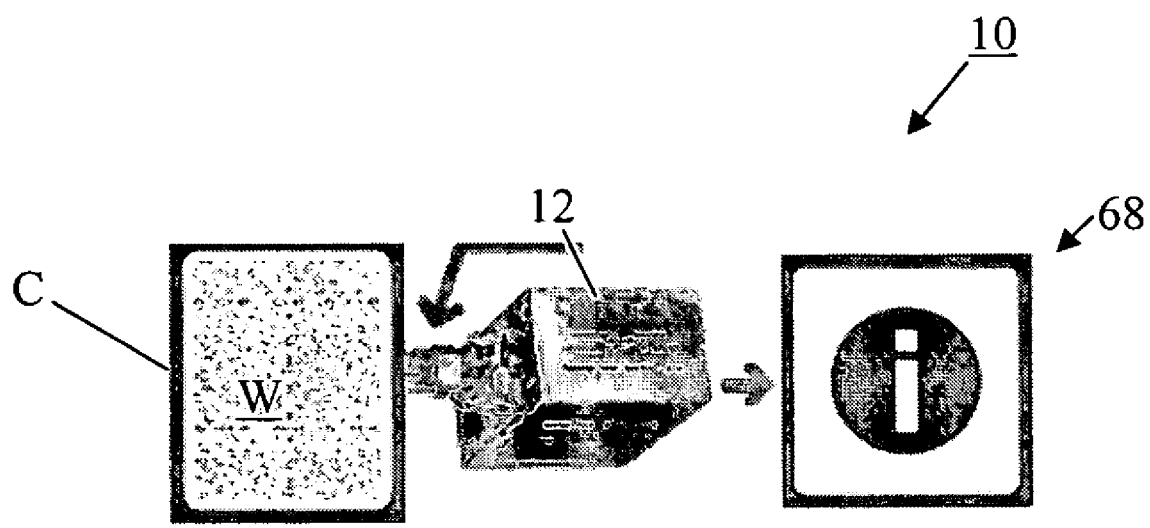
FIG. 2 is a schematic view of a method according to an aspect of the invention, particularly showing a licensed and upgradeable optical head directly coupled in a process line.
Figure 3:
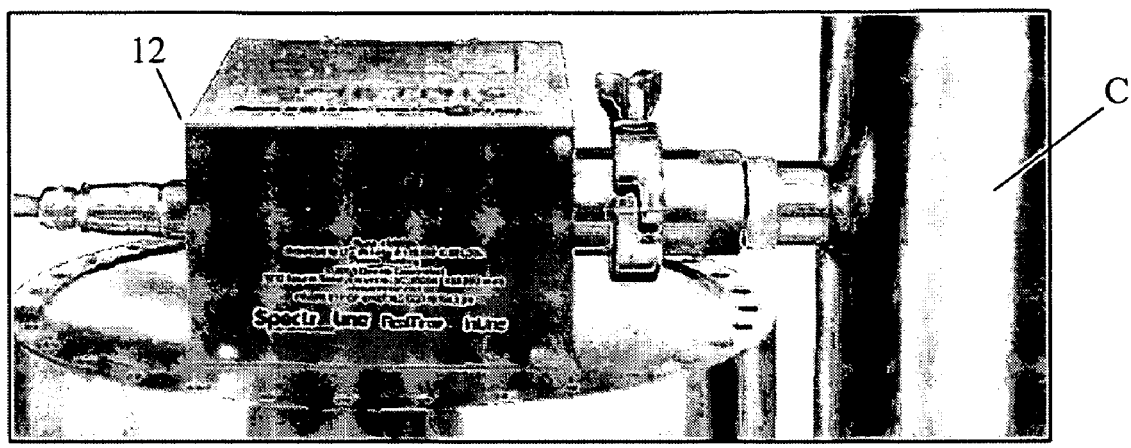
FIG. 3 is a partial, perspective view of the process line and the optical head as in FIG. 2.

It is to be understood by one of ordinary skill in the art that the present discussion is a description of exemplary embodiments only and is not intended as limiting the broader aspects of the present invention.

DETAILED DESCRIPTION OF THE DISCLOSURE

Detailed reference will now be made to the drawings in which examples embodying the present invention are shown. The detailed description uses numerical and letter designations to refer to features of the drawings. Like or similar designations of the drawings and description have been used to refer to like or similar parts of the invention.

The drawings and detailed description provide a full and written description of the invention, and of the manner and process of making and using it, so as to enable one skilled in the pertinent art to make and use it, as well as the best mode of carrying out the invention. However, the examples set forth in the drawings and detailed description are provided by way of explanation only and are not meant as limitations of the invention. The present invention thus includes any modifications and variations of the following examples as come within the scope of the appended claims and their equivalents.

The present invention is application specific and designed for specific compounds, environments and concentrations of interest according to the following general steps:

Receive & review customer-provided, original spectra
Perform theoretical multivariate analysis
  Establish core viability of using interaction of light with matter (spectroscopy) to obtain useful result for this specific application
  Determine theoretical limits of ultimate performance
Design a complete optical computing system
  Includes all subsystems.
  Multiple designs and variations are considered
Ascertain key performance parameters of complete system
Iterate on designs/parameters/performance
Convey results (range, precision, time to measure, etc.) to customer More particularly, according to one aspect of the invention, a SPECTRINLINE™ brand computer is designed, produced and integrated by OMETRIC Corporation of Columbia, S.C. The SPECTRINLINE™ brand computer is designed based on spectra provided by a customer. The spectra are of mixtures of compounds of interest and their basic and expected concentrations across the range of expected interferents in the spectral regions of interest (e.g., V, Vis, NIR, MIR, IR). Phases can be solids, liquids, gases and combinations such as powders, solutions, and the like. Modes of operation include transmission, reflection, and transfection modes. Expected system performance is determined for analytes and interferents of interest (e.g. concentration range, accuracy, speed of measurement, configuration, etc.). By way of example, this determination can be made on the order of a few days after receipt of the customer's data.

As used herein, the term "interferents" means an environmental variability universe, which can be provided by the customer in a data set. More specifically, interferents make-up the universe in which the process operates. Thus, interferents include but are not limited to time, pressure, temperature, vibration, humidity, process component variability (i.e., concentrations of other materials in the process) and the like.

According to the invention, no material samples, identity of the materials of interest, spectra of the pure compounds, or any other proprietary, or confidential or sensitive information about the compounds or their production process are required. Also, risk of exposure of confidential customer information and materials is reduced according to the invention. Further, no internal resources are committed to long and lengthy feasibility projects.

Turning now to FIGS. 2-5, an optical analysis system 10 includes the in-line, SPECTRINLINE™ brand computer or optical head 12 installed in an industrial process line of a customer for monitoring a workpiece or sample W in a container C, e.g., monitoring blending of pharmaceutical powders. A system 68, which is described in further detail below is used to control system parameters such as data logging, sampling time, process control feedback, or other data output requirements.

Figure 4:
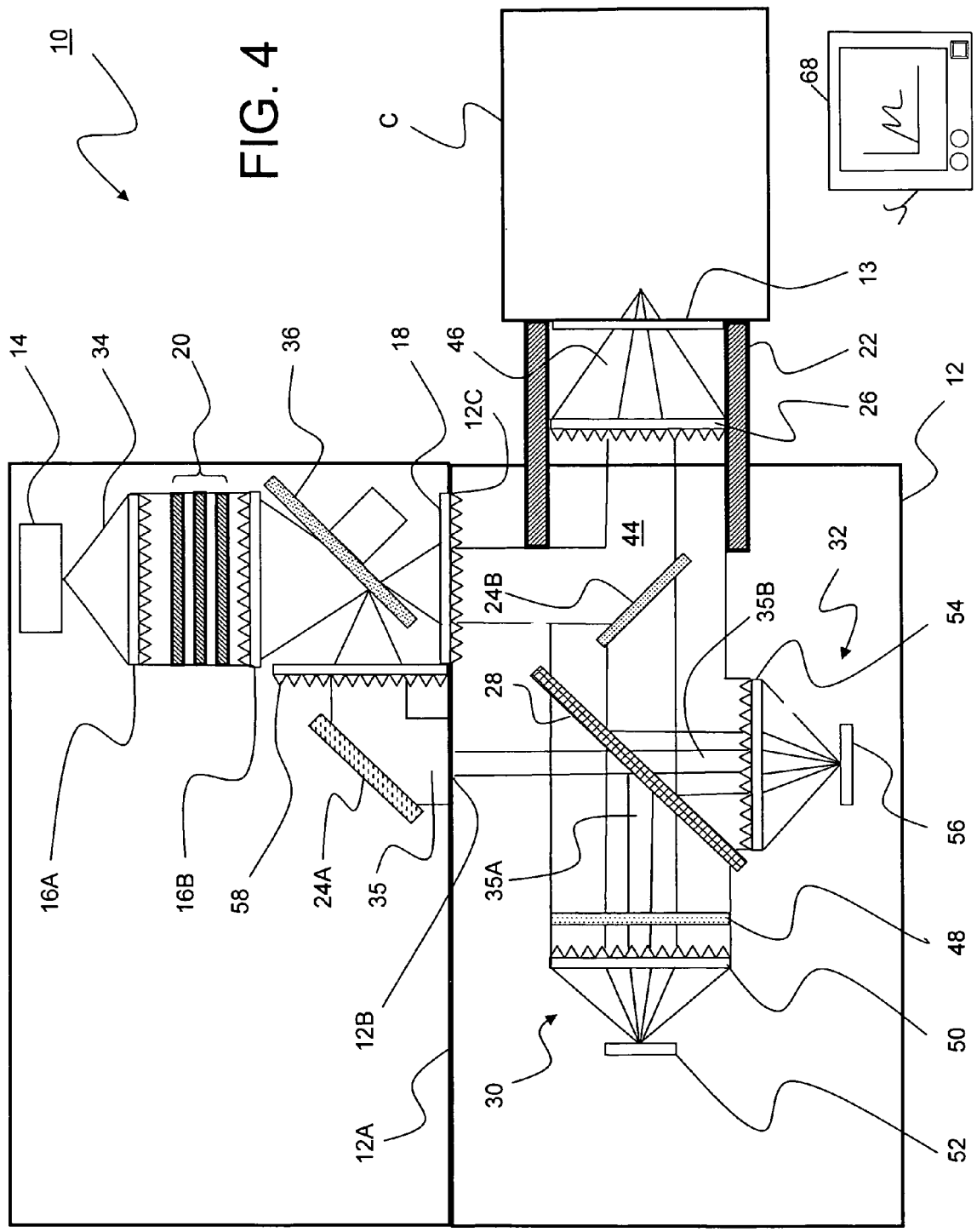
FIG. 4 is a partial, top perspective view of the process line as in FIG. 3, particularly showing upgradeable elements of the optical head and other licensed, upgradeable components according to further aspects of the invention.
Figure 5:
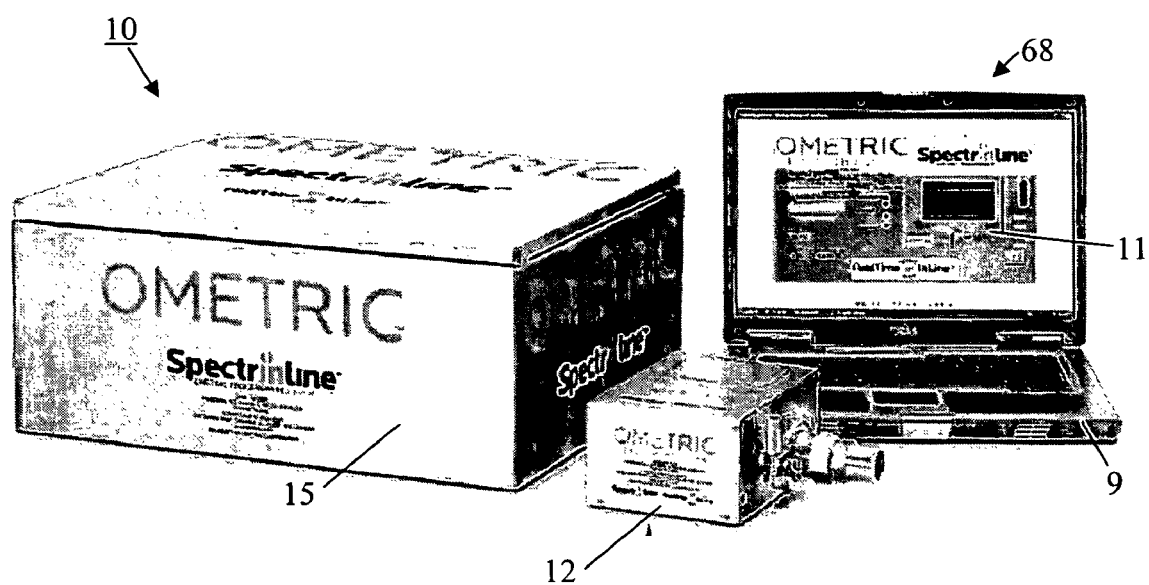
FIG. 5 is a perspective view of various licensed, upgradeable components according to further aspects of the present invention.

With particular reference now to FIG. 4, the optical analysis system 10 introduced above includes the optical head 12, an illumination or light source 14, a chopper wheel 36, a plurality of spectral elements 20, a focusing lens 26, a beam splitter 28, a first detector 30 including a multivariate optical element 48 and a second detector 32. As shown, the illumination source 14 provides a light 34, which passes through a collecting Fresnel lens 16A and into and through the spectral element(s) 20. In this example, the illumination source 14 is rated for at least about 10,000 hours of operation, which alleviates a need for redundant illumination sources, though they may be provided if desired. Also in this example, the collecting Fresnel lens 16A is sized to be about 1.5 square inches and is spaced about 0.6 inches from the illumination source 14. The skilled artisan will instantly recognize that these dimensions can be adjusted according to particular system requirements and are not meant as limitations of the invention.

As shown in FIG. 4, light 34 passes through the spectral elements 20, which filter out undesired wavelengths in order to bound a desired spectral region, e.g., 1500-2000 nm, in order to target a particular chemical material of interest. Light 34 is focused by focusing Fresnel lens 16B, which is also sized to be about 1.5 square inches and spaced about 1 inch to about 3 inches from the chopper wheel 136. As shown, the chopper wheel 36 reflects a portion of light 34 as a calibration or reference light 35 and a transmitted light 44. Calibration light 35 is collimated by lens 58 before reflecting from a first mirror 24A through an adjustable aperture 12B in a bulkhead 12A of the optical head 12. The aperture 12B is adjustable to dictate a desired amount of the calibration light 35. Finally, calibration light 35 impinges on beam splitter 28 thereby sending a portion 35A of calibration light 35 to the first MOE detector 52 and a portion 35B of calibration light 35 to the second or baseline detector 56.

FIG. 4 further illustrates that transmitted light 44 passes from the chopper wheel 36 into a collimating Fresnel lens 18, which in this example is sized to be about 1.5 square inches and is spaced from about 0.5 to about 1.5 inches from the chopper wheel 36. The transmitted light 44 passes through another adjustable aperture 12C in the bulkhead 12A and impinges upon a second mirror 24B, which directs the transmitted light 44 toward a sample in a container C, such as mixing vat or blender. The skilled artisan will recognize that the container could be a conveyor belt or other device for holding or transporting the sample and is not limited to an enclosed container.

As shown in FIG. 4, the transmitted light 44 is focused by the focusing Fresnel lens 26, which in this example may be round and about 1 inch in diameter and is adjustable with an inner tube 22. Also in this example, lens 26 may be positioned about 0.6 inches from an outer surface of the container C. As shown, the transmitted light 44, now focused, passes through a transmissive window 13, which in this example is approximately 1 inch in diameter and includes an anti-reflective (AR) coating on either or both sides. The window 13 provides a physical separation between the system 10 and a chemical process in the container C to ensure that the chemical process does not interfere with the measuring process of the optical analysis system 10, and likewise that the electrical functions of the system 10 do not interfere with the chemical process. The AR coating improves the signal by reducing interfering reflectances.

As further shown in FIG. 4, the transmitted light 44 enters the container C and reflects from the sample as a carrier light 46. Those skilled in the art will appreciate that the sample can be a moving mixture such as a chemical mixture, a pharmaceutical blend, a food process, a chemical process; more specifically, such as an aspirin and an excipient being blended in real time, or a plurality of tablets passing by on a conveyor belt at high speed, or milk mixed with vitamins.

FIG. 4 further illustrates that the carrier light 46 is directed by the tube 22 in a direction of the first detector 30. Eventually, the carrier light 46 impinges on the beam splitter 28 and a portion passes in a direction of the detector 32 for baselining with the portion 35B of the calibration light 35. Another portion of the carrier light 46 passes through MOE 48, which as noted above, has been designed based on the chemical(s) of interest and the various components of the system 10. Finally, that portion of the carrier light 46, having passed through the MOE 48, is focused by lens 50 and received by the detector 52. As described above, the two signals collected by the detectors 32 and 52 can be manipulated, e.g., mathematically, to extract and ascertain information about the sample carried by the carrier light 46. Various detectors such as PbSe, PbS, Si, Ge, InAs, InGaAs, HgCdTe and the like are suitable for use as the detectors 52,56 in the optical analysis system 10.

As further shown in FIG. 4, a gain mechanism 64 is in communication with the detectors 30, 32 and the MOE 48. The gain mechanism 64 weights a magnitude of the property of an orthogonal component of a portion of the carrier light 48 as described, for instance, by Myrick et al. in U.S. Pat. No. 6,198,531 B1 and in U.S. Pat. No. 6,529,276 B1 to Myrick, which are both incorporated herein by reference thereto.

Also, in an additional aspect of the invention as shown in FIG. 4, the system 68 using an electrochemical or chemometric model can be employed to make similar or same measurements of the light 46 reflected from the sample W as the measurements described in the foregoing embodiments. By way of example but not of limitation, the system 68 may be one as described by Myrick et al. in PCT Application Number PCT/US2004/043742, based on U.S. Provisional Application No. 60/533,570, filed Dec. 31, 2003, which are incorporated herein by reference to these applications.

Due to variations in system optical and electronic performance combined with changes in sample reflectance, the optical analysis system 10 may use a reference signal (and detector) to account for those variations. For a system with small such variation, it would be possible to use a single detector (with the MOE). In this case, the response from the reference detector would be considered a constant.

Specifically, for improved detector performance, the light signal can be modulated by continuously monitoring the intensity of a beam of light. The easiest way to achieve this is to allow the beam to impinge upon some kind of photoelectric detector (such as a photo-diode or photo-multiplier tube) and monitor the resultant electrical output. If the light beam is very weak then the electrical output from the photodetector will be very small and therefore some sort of amplification of this signal will be required.

A continuous optical beam will create a DC signal at the output of the photo-detector so any subsequent amplifier used to increase this signal level will need to be capable of amplifying DC. Although this is perfectly feasible, DC amplifiers do suffer from drift due to temperature fluctuations. This is particularly evident in high gain amplifiers. Also any other perturbation of the signal due to other stimuli (stray light for example) will also be amplified and appear as genuine output.

If the signal of interest (that is the original light beam) could be made to act as an AC signal then the detector output would be AC and any further amplification could be carried out with an AC (only) amplifier. AC amplifiers do not suffer from temperature drift and will not respond to DC signals. So the only signal that would be amplified is that due to the (AC) light beam. To make a light beam act in an AC manner it needs to be turned on and off regularly and accurately. This can be achieved by chopping.

The most common technique is to pass the beam through a rotating disk that has holes or slots cut into it at regular intervals. As the disk rotates it "chops" the beam producing an on/off signal which when detected by a photo-detector will appear as an AC signal.

The mechanical chopping of the light beam is very precisely controlled by the chopper and therefore the resultant AC signal due to the chopped light is at a known and stable frequency which can be monitored and amplified easily.

The operating principle of a photoelastic modulator (PEM) modulates light polarization which manifests the photoelastic effect in which a mechanically stressed sample exhibits optical birefringence.

In addition to the reflectance mode described above, one or more optical analysis systems can operate in a transmission mode in conjunction with the foregoing embodiments. In such a case, light is directed (passes) through the sample W, e.g., a fluid sample, and collected on another side of the sample W to enable study of particle density in the fluid in conjunction with the chemical content described above. For instance, the system 10 can be configured to operate in transmission mode where the light is shone through the sample W to a similar detection system as shown in FIG. 4. Additionally, or alternatively, a mirrored surface can be placed within the transmissive sample W to reflect the light back into the system 10.

The present invention may be better understood with reference to the following exemplary method and examples and to FIG. 6.

Methodology

Sample Preparation/Collection (optional)

Samples were prepared either with a known concentration of the analyte of interest, or were collected and then analyzed to quantify the amount of the analyte of interest.

Optical spectra were collected of each of the samples. Sometimes duplicate spectra were collected for each sample.

Data Analysis

All data sets sent by customer that contained analyte concentration information were analyzed. The data sets were complete in that they spanned the universe of expected analyte concentration and system and interferent variation.

Each spectrum was used in the analysis. In no case was any spectrum excluded, nor were any "outlying" data points removed.

The spectra were utilized in transmission mode as opposed to absorbance mode since the final system in this example operates in transmission mode, and the modeling must therefore be done in transmission mode.

The transmission spectra were normalized to unit area because the exemplary system operates in dual beam mode and will automatically normalize or correct for intensity variations.

The spectra were not modified further to avoid unintentional consequences and potentially erroneous conclusions due to additional manipulations/corrections in the original data set.

System Simulation

Actual systems were designed, including lamps, optical elements, detectors, and multivariate optical elements The performance of each system was analyzed to determine the appropriate system to present to the customer.

EXAMPLE I

Pharmaceutical Application

About Ninety (90) spectra were analyzed:

Spectra were separated into two groups: Calibration (to develop appropriate models) and Validation (to test the models for their predictive accuracy). No spectra were discarded as "outliers" in the analysis.

Spectra were analyzed using methods according to the invention and theoretical and practical precision determined.

The entire spectral range from 945 to 1700 nm of the exemplary data was modeled. Many different spectral subregions were modeled, and an optimal spectral range for the exemplary system determined.

Systems with a theoretical precision of <±0.2% (standard deviation) were obtained.

With basic theoretical performance levels and spectral range determined, a complete system was designed and modeled for total system performance:

Many different designs and subsystems were tested and iterated.

>100 application specific MOE real designs were investigated. Several viable designs were successfully obtained.

All the subsystem and spectral subcomponents were designed and performance modeled.

The exemplary system configuration was modeled for transmission. In this application, reflection was not appropriate as it is necessary to sense the active throughout the liquid melt. Thus, transmission mode was determined to be the most appropriate for this application.

Finally, the entire system performance was determined. Complete system parameters, e.g. S/N and measurement times, were included in this analysis.

EXAMPLE II

Aspirin System Analysis

Eleven (11) samples were prepared with known quantities of aspirin and lactose, ranging from 0% aspirin to 100% aspirin.

NIR spectra were collected for each of the samples.

Spectra were separated into two groups: Calibration (to develop appropriate models) and Validation (to test the models for their predictive accuracy). No spectra were discarded as "outliers" in the analysis.

Spectra were analyzed using methods according to the invention and theoretical and practical precision determined.

Principal Component Analysis and Partial Least Squares analysis were performed on the spectral data and a predicted error was calculated.

Spectral regions from 1000 nm to 3500 nm were analyzed along with subregions.

Concentration ranges within the full 0-100% range were analyzed to enabled improved model prediction.

With basic theoretical performance levels and spectral range determined, a complete system was designed and modeled for total system performance:

Many different designs and subsystems were tested and iterated.

>100 application specific MOE real designs were investigated. Several viable designs were successfully obtained.

All the subsystem and spectral subcomponents were designed and performance modeled.

The exemplary system configuration was modeled for transmission. In this application, reflection was not appropriate as it is necessary to sense the active throughout the liquid melt. Thus, transmission mode was determined to be the most appropriate for this application.

Finally, the entire system performance was determined. Complete system parameters, e.g. S/N and measurement times, were included in this analysis.

Turning now to FIG. 6, a highly tailored, application specific system can be designed to meet specific needs of a company. According to this aspect of the invention, an assessment and design process 100 includes receiving a data set from the customer including spectra, associated concentration, and a range of interferents (110). As necessary, the data are converted to a desired data format (e.g., MATLAB brand, EXCEL brand or similar formats) and the mode of data—transmission, absorbance—must be determined and understood. In this example, the data are converted to transmission.

FIG. 6 shows that the data are analyzed to determine expected theoretical system performance (120). Specifically, a theoretical analysis of the data is conducted to establish viability of using spectroscopy; to determine theoretical performance of system; to group data into calibration set and validation sets; to use principal component analysis and PLS analysis to determine likely accuracy of calibration and validation data sets; to use PCA, PLS to explore spectral regions; and to identify appropriate spectral regions to make measurement of interest.

FIG. 6 further shows simulating the entire application specific system performance to determine prediction accuracy, over what analyte range and with what signal to noise (S/N) ratio (hence measurement time or material flow speed or averaging time) (130), comparing the expected performance with the customer needs (140), and establishing system performance specifications that meet the customer needs and are achievable with the system design (150). Accordingly, and more specifically, an optical computer, such as the optical computer 12 described above, is designed by identifying appropriate spectral elements including band pass elements, cut-off elements, illumination source(s), detection element(s), sampling related (focusing lens, sapphire window, fiber probe, etc.) and MOE materials. Also, various combinations, configurations or system design are explored. The MOE is designed subsequently, and refined based on needed accuracy, S/N ratio, measurement speed and the like. Also according to FIG. 6 in 150, a sampling procedure for the specific application is determined and best transmission (transflectance, reflectance, etc.) is considered. Finally, the system is designed to meet the customer needs (150).

Although the invention has been described in such a way as to provide an enabling disclosure for one skilled in the art to practice the invention, it should be understood that the descriptive examples of the invention are not intended to limit the present invention to use only as shown in the figures. For instance, the optical head 12 can be shaped as a square, an oval, or in a variety of other shapes. Further, a variety of light sources can be substituted for those described above. It is intended to claim all such changes and modifications as fall within the scope of the appended claims and their equivalents. Thus, while exemplary embodiments of the invention have been shown and described, those skilled in the art will recognize that changes and modifications may be made to the foregoing examples without departing from the scope and spirit of the invention.

That which is claimed is:

1. A method of assessing feasibility of a project, the method comprising:
    receiving a datum associated with a desired process;
    designing, using one or more computers, an application specific multivariate optical computing system based on the datum, comprising:
    analyzing the datum;
    separating the datum into calibration and validation portions thereof;
    developing one or more models of at least one component of the application specific multivariate optical computing system using the calibration portion of the datum; and testing the one or more models using the validation portion of the datum; wherein the application specific multivariate optical computing system incorporates one or more of the models; and
    evaluating, using the one or more computers, a set of input parameters to determine an applicability of the application specific multivariate optical computing system to the desired process;
    wherein developing the one or more models comprises:
    modeling, using the one or more computers and the calibration portion of the datum, two or more of the following elements of the application specific multivariate optical computing system:
    an illumination source adapted to provide at least a calibration light;
    a beam splitter adapted to split the calibration light into first and second portions thereof, and further adapted to split a carrier light into first and second portions thereof;
    a baseline detector to which the respective first portions of the calibration light and the carrier light are adapted to be sent by the beam splitter;
    an element detector to which the respective second portions of the calibration light and the carrier light are adapted to be sent by the beam splitter; or
    a multivariate optical element through which the respective second portions of the calibration light and the carrier light are adapted to pass before being received by the element detector.

2. The method of assessing as in claim 1, wherein the desired process is one of a pharmaceutical process, a fuel process, a hazardous substance process, a law enforcement process, a government process, a chemical process, a food process, and a beverage customer process.

3. The method of assessing as in claim 1, wherein the datum is data selected from the group consisting of a compound of interest, a representative spectrum of the compound of interest, a representative spectra of a mixture, a concentration of interest, an analyte of interest, an expected concentration across a range of at least one expected interferent and combinations thereof.

4. The method of assessing as in claim 3, wherein the spectrum is in spectral regions of interest selected from the group consisting of ultraviolet, visible, near infrared, mid infrared, infrared and combinations thereof.

5. The method of assessing as in claim 3, wherein the at least one expected interferent is selected from the group consisting of pressure, temperature, humidity, vibration, process component variability and combinations thereof.

6. The method of assessing as in claim 3, further comprising providing at least one of a concentration range, an accuracy, a speed of measurement, and a system configuration for the analyte of interest.

7. The method of assessing as in claim 1, further comprising determining performance of the application specific multivariate optical computing system for the datum.

8. The method of assessing as in claim 1, further comprising providing feedback to the desired process.

9. The method of assessing as in claim 1, further comprising analyzing the datum remote from a facility where the application specific multivariate optical computing system is to be installed.

10. A method of assessing feasibility of a project, the method comprising:
    receiving a datum associated with a desired process;
    designing, using one or more computers, an application specific multivariate optical computing system based on the datum, comprising:
    analyzing the datum;
    separating the datum into calibration and validation portions thereof;
    developing one or more models of at least one component of the application specific multivariate optical computing system using the calibration portion of the datum; and
    testing the one or more models using the validation portion of the datum;
    wherein the application specific multivariate optical computing system incorporates one or more of the models;
    evaluating a set of input parameters to determine an applicability of the application specific multivariate optical computing system to the customer desired process; and
    providing feedback for the desired process with the application specific multivariate optical computing system;

wherein developing the one or more models comprises:
modeling, using the one or more computers and the calibration portion of the datum, two or more of the following elements of the application specific multivariate optical computing system:
an illumination source adapted to provide at least a calibration light;
a beam splitter adapted to split the calibration light into first and second portions thereof, and further adapted to split a carrier light into first and second portions thereof;
a baseline detector to which the respective first portions of the calibration light and the carrier light are adapted to be sent by the beam splitter;
an element detector to which the respective second portions of the calibration light and the carrier light are adapted to be sent by the beam splitter; or
a multivariate optical element through which the respective second portions of the calibration light and the carrier light are adapted to pass before being received by the element detector.

11. The method of assessing as in claim 10, wherein the customer desired process is one of a pharmaceutical customer process, a fuel process, a hazardous substance process, a law enforcement process, a government process, a chemical process, a food process, and a beverage customer process.

12. The method of assessing as in claim 10, wherein the datum is data selected from the group consisting of a compound of interest, a representative spectrum of the compound of interest, a representative spectra of a mixture, a concentration of interest, an analyte of interest, an expected concentration across a range of at least one expected interferent and combinations thereof.

13. The method of assessing as in claim 12, wherein the spectrum or spectra is in spectral regions of interest selected from the group consisting of ultraviolet, visible, near infrared, mid infrared, infrared and combinations thereof.

14. The method of assessing as in claim 12, wherein the at least one expected interferent is selected from the group consisting of pressure, temperature, humidity, vibration, process component variability and combinations thereof.

15. The method of assessing as in claim 12, further comprising providing at least one of a concentration range, an accuracy, a speed of measurement, and a system configuration for the analyte of interest.

16. The method of assessing as in claim 10, further comprising determining performance of the application specific multivariate optical computing system for the datum.

17. The method of assessing as in claim 10, further comprising analyzing the datum remote from a facility where the application specific multivariate optical computing system is to be installed.

18. A method of assessing feasibility of a project, the method comprising:
receiving a datum associated with consumable products customer and a desired process therefor;
designing, using one or more computers, an application specific multivariate optical computing system based on the datum, comprising:
analyzing the datum;
separating the datum into calibration and validation portions thereof;
developing one or more models of at least one component of the application specific multivariate optical computing system using the calibration portion of the datum; and
testing the one or more models using the validation portion of the datum;
wherein the application specific multivariate optical computing system incorporates one or more of the models; and
evaluating, using the one or more computers, a set of input parameters to determine an applicability of the application specific multivariate optical computing system to the desired process;
wherein developing the one or more models comprises:
modeling, using the one or more computers and the calibration portion of the datum, two or more of the following elements of the application specific multivariate optical computing system:
an illumination source adapted to provide at least a calibration light;
a beam splitter adapted to split the calibration light into first and second portions thereof, and further adapted to split a carrier light into first and second portions thereof;
a baseline detector to which the respective first portions of the calibration light and the carrier light are adapted to be sent by the beam splitter;
an element detector to which the respective second portions of the calibration light and the carrier light are adapted to be sent by the beam splitter; or
a multivariate optical element through which the respective second portions of the calibration light and the carrier light are adapted to pass before being received by the element detector.

19. The method of assessing as in claim 18, wherein the desired process is one of a pharmaceutical process, a fuel process, a hazardous substance process, a law enforcement process, a government process, a chemical process, a food process, and a beverage process.

20. The method of assessing as in claim 18, wherein the datum is data selected from the group consisting of a compound of interest, a representative spectrum of the compound of interest, a representative spectra of a mixture, a concentration of interest, an analyte of interest, an expected concentration across a range of at least one expected interferent, and combinations thereof.

21. The method of assessing as in claim 20, wherein the spectrum is in spectral regions of interest selected from the group consisting of ultraviolet, visible, near infrared, mid infrared, infrared and combinations thereof.

22. The method of assessing as in claim 20, wherein the at least one expected interferent is selected from the group consisting of pressure, temperature, humidity, vibration, process component variability and combinations thereof.

23. The method of assessing as in claim 20, further comprising providing at least one of a concentration range, an accuracy, a speed of measurement, and a system configuration for the analyte of interest to.

24. The method of assessing as in claim 18, further comprising determining performance of the application specific multivariate optical computing system for the datum.

25. The method of assessing as in claim 18, further comprising providing feedback for the desired process.

26. The method of assessing as in claim 18, further comprising analyzing the datum remote from a facility where the application specific multivariate optical computing system is to be installed.

27. The method of assessing as in claim 1, wherein developing the one or more models comprises:
modeling, using the one or more computers, at least the following elements of the application specific multivariate optical computing system:
the illumination source adapted to provide a light;

one or more spectral elements through which the light provided by the illumination source is adapted to pass;

a chopper wheel adapted to reflect a first portion of the light provided by the illumination source as the calibration light and a second portion of the light provided by the illumination source as a transmitted light;

a first lens adapted to collimate the calibration light;

a first mirror adapted to reflect the calibration light;

the beam splitter adapted to split the calibration light into first and second portions thereof;

a first detector to which the first portion of the calibration light is adapted to be sent by the beam splitter;

a second detector to which the second portion of the calibration light is adapted to be sent by the beam splitter;

a second lens adapted to collimate the transmitted light;

a second mirror adapted to direct the transmitted light;

a multivariate optical element through which a portion of a reflected carrier light is adapted to pass before being received by the second detector; and a third lens adapted to focus the portion of the reflected carrier light.

28. The method of assessing as in claim 10, wherein developing the one or more models comprises:

modeling, using the one or more computers, at least the following elements of the application specific multivariate optical computing system:

the illumination source adapted to provide a light;

one or more spectral elements through which the light provided by the illumination source is adapted to pass;

the chopper wheel adapted to reflect a first portion of the light provided by the illumination source as a calibration light and a second portion of the light provided by the illumination source as a transmitted light;

a first lens adapted to collimate the calibration light;

a first mirror adapted to reflect the calibration light;

the beam splitter adapted to split the calibration light into first and second portions thereof;

a first detector to which the first portion of the calibration light is adapted to be sent by the beam splitter;

a second detector to which the second portion of the calibration light is adapted to be sent by the beam splitter;

a second lens adapted to collimate the transmitted light;

a second mirror adapted to direct the transmitted light;

a multivariate optical element through which a portion of a reflected carrier light is adapted to pass before being received by the second detector; and a third lens adapted to focus the portion of the reflected carrier light.

29. The method of assessing as in claim 18, wherein developing the one or more models comprises:

modeling, using the one or more computers, at least the following elements of the application specific multivariate optical computing system:

the illumination source adapted to provide a light;

one or more spectral elements through which the light provided by the illumination source is adapted to pass;

a chopper wheel adapted to reflect a first portion of the light provided by the illumination source as a calibration light and a second portion of the light provided by the illumination source as a transmitted light;

a first lens adapted to collimate the calibration light;

a first mirror adapted to reflect the calibration light;

the beam splitter adapted to split the calibration light into first and second portions thereof;

a first detector to which the first portion of the calibration light is adapted to be sent by the beam splitter;

a second detector to which the second portion of the calibration light is adapted to be sent by the beam splitter;

a second lens adapted to collimate the transmitted light;

a second mirror adapted to direct the transmitted light;

a multivariate optical element through which a portion of a reflected carrier light is adapted to pass before being received by the second detector; and a third lens adapted to focus the portion of the reflected carrier light.

30. The method of assessing as in claim 1, further comprising producing the application specific multivariate computing system.

31. The method of assessing as in claim 10, further comprising producing the application specific multivariate computing system in accordance with the design thereof.

32. The method of assessing as in claim 18, further comprising producing the application specific multivariate computing system in accordance with the design thereof.

* * * * *